United States Patent
Lv et al.

(10) Patent No.: US 8,098,891 B2
(45) Date of Patent: Jan. 17, 2012

(54) EFFICIENT MULTI-HYPOTHESIS MULTI-HUMAN 3D TRACKING IN CROWDED SCENES

(75) Inventors: Fengjun Lv, San Jose, CA (US); Wei Xu, Los Gatos, CA (US); Yihong Gong, Saratoga, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 667 days.

(21) Appl. No.: 12/277,278

(22) Filed: Nov. 24, 2008

(65) Prior Publication Data
US 2009/0296985 A1 Dec. 3, 2009

Related U.S. Application Data

(60) Provisional application No. 60/990,942, filed on Nov. 29, 2007.

(51) Int. Cl.
*G06K 9/00* (2006.01)
*H04N 7/18* (2006.01)
(52) U.S. Cl. .................. 382/103; 382/285; 348/143
(58) Field of Classification Search ............ 382/100, 382/103, 106, 107, 154, 155, 156, 162, 168, 382/173, 181, 190, 203, 209, 214, 219, 220, 382/232, 243, 254, 274, 276, 285–298, 305, 382/312; 348/94, 143; 340/10.1; 706/14; 703/6; 455/456.1
See application file for complete search history.

(56) References Cited

U.S. PATENT DOCUMENTS

| | | | | |
|---|---|---|---|---|
| 7,324,824 B2* | 1/2008 | Smith et al. | ................ | 455/456.1 |
| 7,366,645 B2* | 4/2008 | Ben-Arie et al. | ................. | 703/6 |
| 7,499,571 B1* | 3/2009 | Han et al. | ...................... | 382/103 |
| 7,558,762 B2* | 7/2009 | Owechko et al. | ............... | 706/14 |
| 7,623,676 B2* | 11/2009 | Zhao et al. | .................... | 382/103 |
| 7,932,812 B2* | 4/2011 | Nerat | ........................... | 340/10.1 |
| 7,932,923 B2* | 4/2011 | Lipton et al. | .................. | 348/143 |

OTHER PUBLICATIONS

Zhao et al, Segmentation and Tracking of Multiple Humans in Complex Situaitons, IEEE 2001.
Berclaz et al, Robust People Tracking with Global Trajectory Optimization, 2006 IEEE Computer Society Conference on Computer Vision and Pattern Recognition, Jun. 2006.
Mei Han et al, An Algorithm for Multiple Object Trajectory Tracking, IEEE 2004.
Sadd et al, A Multiview Approach to Tracking People in Crowded Scenes using a Planar Homography Constraint, European Conference on Computer Vision (2006).
Brostow, et al, Unsupervised Bayesian Detection of Independent Motion in Crowds, 2006 IEEE Computer Society Conference on Computer Vision and Pattern Recognition, Jun. 2006.

* cited by examiner

*Primary Examiner* — Seyed Azarian
(74) *Attorney, Agent, or Firm* — Bao Tran; Joseph Kolodka

(57) ABSTRACT

System and methods are disclosed to perform multi-human 3D tracking with a plurality of cameras. At each view, a module receives each camera output and provides 2D human detection candidates. A plurality of 2D tracking modules are connected to the CNNs, each 2D tracking module managing 2D tracking independently. A 3D tracking module is connected to the 2D tracking modules to receive promising 2D tracking hypotheses. The 3D tracking module selects trajectories from the 2D tracking modules to generate 3D tracking hypotheses.

17 Claims, 8 Drawing Sheets

EFFICIENT MULTI-HYPOTHESIS MULTI-HUMAN 3D TRACKING IN CROWDED SCENES

This application claims priority to provisional application Ser. No. 60/990,942 filed on Nov. 29, 2007, the content of which is incorporated by reference.

BACKGROUND

Video based human tracking is an important task for many applications such as video surveillance, human computer interaction and video content retrieval. Two-dimensional (2D) tracking techniques have been developed where tracking is based on a single video and provides only trajectories of 2D image coordinates. One of the inherent difficulties for such system is an inability to handle large occlusions in crowded scenes. In addition, 2D approaches are not suitable for applications such as human behavior analysis and event detection, because these applications generally require to know the physical attributes in the 3D world (such as 3D location, velocity and orientation) of the tracked person.

Intuitively, these shortcomings can be overcome by using additional videos from different views (3D human tracking). FIG. 1 shows one exemplary set up for 3D human tracking. In FIG. 1, two video cameras Video 1 and Video 2 captures different views of the same region, but from different positions. Video 1 captures images along trajectories 1 and 2. Correspondingly, Video 2 captures images along trajectories 21 and 22.

As illustrated in FIG. 1, at any single frame if the same person is detected in multiple views, rays that connect the camera optical center and the person's image location in each view should, ideally, intersect in 3D space. This not only gives the 3D location of the person but also imposes strong constraint on the legitimacy of the 2D locations (and thus provides feedback to the human detection result) because a wrong location can not intersect with others correctly. The constraint for matching 2D tracking trajectories are even stronger because each additional frame adds additional constraint. It is possible that at single frame human detection from one view may have a wrong match in other views, but the possibility of such mistake drops significantly when a trajectory becomes long enough.

Despite the simplicity of the idea, 3D tracking has received comparatively little attention in the research community, largely due to the extra complexity added to the already complex tracking problem. One problem is the establishment of correspondence between the features in multiple views. Although simple geometric constraints such as planar homography has been exploited, these constraints are not able to provide the actual 3D location of the tracked person. Another issue that follows naturally is the choice of features used for establishing the correspondence. A common approach uses extracted foreground blobs and assumes that the bottom of a blob corresponds to the foot position of a person. With a calibrated camera and a further assumption that the person is standing on the ground plane (or somewhere with a known altitude), a transformation between an image and the 3D world can be determined even from a single view. These approaches rely heavily on background subtraction results, which is a well known difficult problem in itself. In many cases, an extracted blob may not correspond to any real person or a single blob may contain multiple contiguous persons. An even worse situation is that in a crowded scene, as illustrated in FIG. 2, a person's feet may not be visible at all due to occlusion. Alternatively, the system can detect human heads and use their locations as the feature because in a typical surveillance camera setup, human heads are usually visible even in a crowded scene as the one shown in FIG. 2. FIG. 2 shows a crowded scene, where a person's feet may be severely occluded or even invisible, but his/her head is usually visible.

A 2D tracking technique called Multi Hypothesis Tracking (MHT) can be applied, but the technique is complex to process—the MHT system has to maintain a sufficient number of hypotheses, i.e. possible temporal correspondences between observation across different frames. However, this number may grow exponentially over time when the number of targets in the scene is large and thus results in an intractable complexity. The situation worsens when applying MHT to the 3D tracking problem. In real world cases, due to image noise and observation error, the rays mentioned earlier may never perfectly converge to a single 3D point. It is very likely that 2D points from different views are associated incorrectly and this ambiguity in spatial correspondences adds another level of complexity to the problem.

SUMMARY

System and methods are disclosed to perform multi-human 3D tracking with a plurality of cameras. At each view, a module receives each camera output and provides 2D human detection candidates. A plurality of 2D tracking modules are connected to the CNNs, each 2D tracking module managing 2D tracking independently. A 3D tracking module is connected to the 2D tracking modules to receive promising 2D tracking hypotheses. The 3D tracking module selects trajectories from the 2D tracking modules to generate 3D tracking hypotheses.

In one embodiment, the system maintains tracking hypotheses efficiently in a hierarchical fashion. At the bottom level, at each single view, a Convolutional Neural Network provides 2D human detection candidates. At the middle level, each 2D tracking module manages 2D tracking independently for each view and reports only promising 2D tracking hypotheses from that view. And finally at the top level, a 3D tracking module not only selects trajectories from 2D trackers to generate legitimate 3D tracking hypotheses, but also provides feedback to 2D trackers so that each 2D tracker knows how to update its current status in a guided manner.

Advantages of the preferred embodiment may include one or more of the following. The system can handle large occlusions in crowded scenes and to determine 3D locations of the tracked persons. The system can efficiently eliminate many unnecessary hypotheses at very early stage and only select those truly promising hypotheses, so it is considerably faster than the traditional multi-hypothesis tracking (MHT). Traditional MHT algorithms have to maintain a sufficient number of hypotheses in order to correctly track people in a long term. However, this number may grow exponentially when the number of people in the scene is large and makes the complexity intractable. In contrast, the instant system can efficiently eliminate many unnecessary hypotheses at very early stage and only select those truly promising hypotheses, so the system is considerably faster than traditional ones. Such speed enables the system to be used in many new applications. For example, in a shopping mall environment, by tracking the 3D trajectories of customers, store owners can better understand their shopping patterns. When combined with other techniques such as human age and gender recognition, the system can provide accurate customers' demographic

DESCRIPTION

Figure 3A:
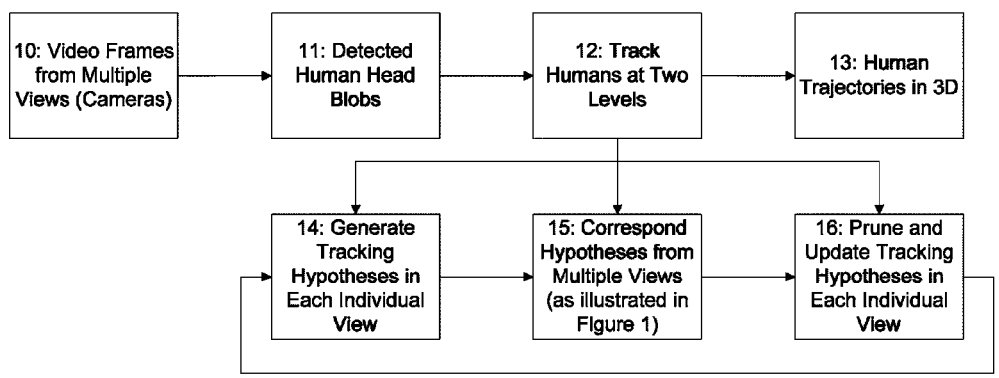
FIG. 3A shows an exemplary 3D tracking system that maintains the tracking hypotheses efficiently in a hierarchical way.

FIG. 3A shows an exemplary 3D tracking system that maintains the tracking hypotheses efficiently in a hierarchical way. In one implementation, FIG. 3A shows a 3D MHT system achieved by utilizing videos from multiple views to give accurate and consistent 3D tracking result. The system efficiently selects promising hypotheses to reduce the searching space small and to keep the complexity at a manageable level. The system maintains the tracking hypotheses efficiently in a hierarchical fashion.

In FIG. 3A, video frames from multiple views are captured (10). The videos are captured from each camera and synchronized based on time-stamps. The process detects human blobs (11) The system uses a detection-driven approach that explicitly detects humans in each frame. One embodiment uses a Convolutional Neural Network (CNN) to detecting human heads in an image. The CNN searches over the whole image at several scales and outputs the following information at each pixel:
- the probability that a blob around the pixel represents a human head
- the size (width and height) of the blob
- the head orientation The system tracks people at two levels (12) and contains three sub-processes described in Box 14, 15 and 16, respectively. The process then tracks human trajectories in 3D for each tracked person (13).

Tracking hypotheses are generated for each individual view (14). The task of 2D tracking is formulated as a data association problem, i.e. matching between new detections and existing tracking hypotheses. Each hypothesis is represented as a tracking trajectory. For each pair of detection and hypothesis, there are two choices: connect or do not connect. The choice is based on some form of difference between the detection and the trajectory and includes the following factors:

Appearance: color histogram is used to represent the object appearance, which is calculated based on pixels within the head blob and is quantized into 64 bins. Symmetric Kullback-Leibler (KL) divergence is then used to measure the difference between two histograms.

Location: Euclidean distance is used to measure the spatial distance between the detection and the last blob of the existing trajectory.

Blob size: The blob size is taken into account because sudden change of the blob size usually indicates a wrong match and should be penalized.

Orientation: Sudden change of the head orientation should also be penalized.

The overall difference score between the detection and the trajectory is a weighted sum of the above factors. We compute the difference score for each pair of detection and hypothesis. The tracking algorithm is to find a set of matches that give the lowest overall difference score.

Corresponding hypotheses from multiple views are also generated (15). From each view, a 2D tracker reports a list of new 2D hypotheses to the 3D tracker. 3D tracking is a data association problem. A 3D tracking hypothesis is defined as a correspondence between a pair of 2D hypotheses from each of the two views and each correspondence results in a 3D trajectory. Similar to 2D hypotheses generation, a pair-wise correspondence matrix is constructed among 2D hypotheses from each of the two views. Similarly, 3D hypotheses are sorted according to their 3D intersection error. The tracking process finds a set of matches that give the lowest overall difference score.

The process prunes and updates tracking hypotheses in each individual view (16). Any 3D hypothesis (including the newly generated as well as previously existing ones) will be pruned if any of the following criteria is met:

Confliction: A hypothesis H_i conflicts with another hypothesis H_j if and only if H_i and H_j share a common 3D trajectory (with a certain length) and the probability of H_i is significantly lower than that of H_j Expiration: A hypothesis H_i is expired if it has not been updated for a certain amount of time. Expiration may be due to that a long 3D trajectory is incorrectly segmented into several shorter ones. In order to reduce such errors, when H_i has just expired, the system checks the boundary proximity between H_i and each of other hypotheses H_j. H_i and H_j can be consolidated into a single hypothesis if and only if the ending spatio-temporal position of H_i is close to the starting position of H_j and the ending blob of H_i and the starting blob of H_j (in both views) have a similar appearance (color distribution).

The 2D trajectories are updated in a synchronized manner. That is, if a 3D trajectory is added, pruned, or combined with another 3D trajectory, its corresponding 2D trajectories will be updated the same way.

If a 2D hypothesis can not find its counterpart in the other view, its new head blob can be connected to its existing trajectory (i.e. increment the trajectory by one frame).

Finally if a head blob has not been assigned to any 2D hypothesis, it will be initialized as the start of a new 2D trajectory.

In FIG. 3A, at the lowest level, at each single view, a Convolutional Neural Network provides 2D human detection candidates to a 2D tracking module. At the middle level, each 2D tracking module manages 2D tracking independently and reports only promising 2D tracking hypotheses to a 3D tracking module. Finally, at the top level, the 3D tracking module not only selects trajectories from 2D tracking modules to generate legitimate 3D tracking hypotheses, but also sends feedback to 2D tracking modules so that each 2D tracking module knows how to update its current status in a guided manner.

Figure 3B:
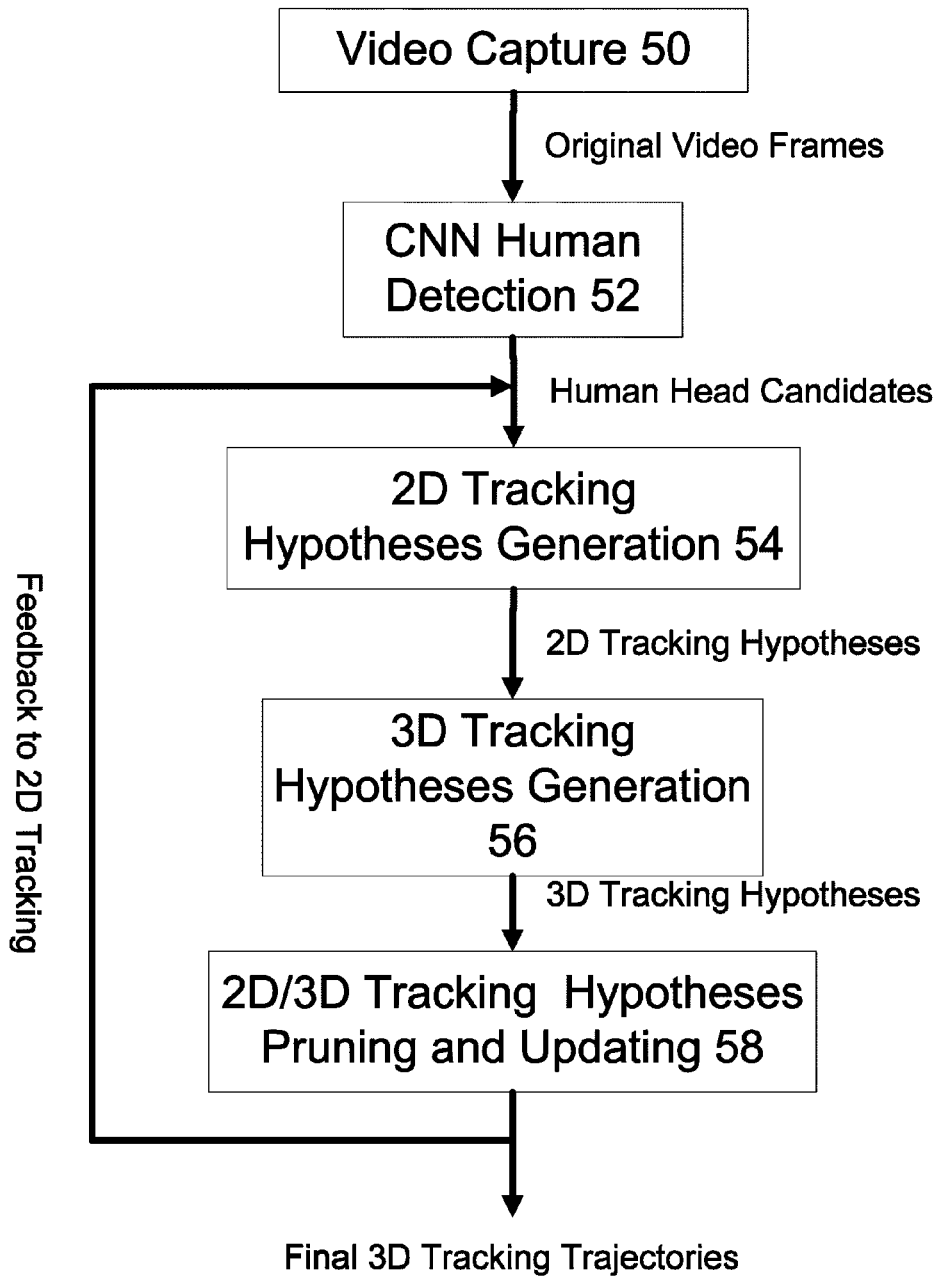
FIG. 3B shows an exemplary 3D tracking process.

FIG. 3B shows an exemplary 3D tracking process that mirrors hardware blocks of FIG. 3(a). First, original video frames are captured (50). Next, CNN Human Detection is done (52). A 2D Tracking Hypotheses Generation is performed (54), followed by a 3D Tracking Hypotheses Generation (56). A 2D/3D Tracking Hypotheses Pruning and Updating process is then performed (58) and the information can be used as feedback to the 2D tracking hypothesis generation 54. The system generates as output the 3D tracking trajectories (58).

Figure 3C:
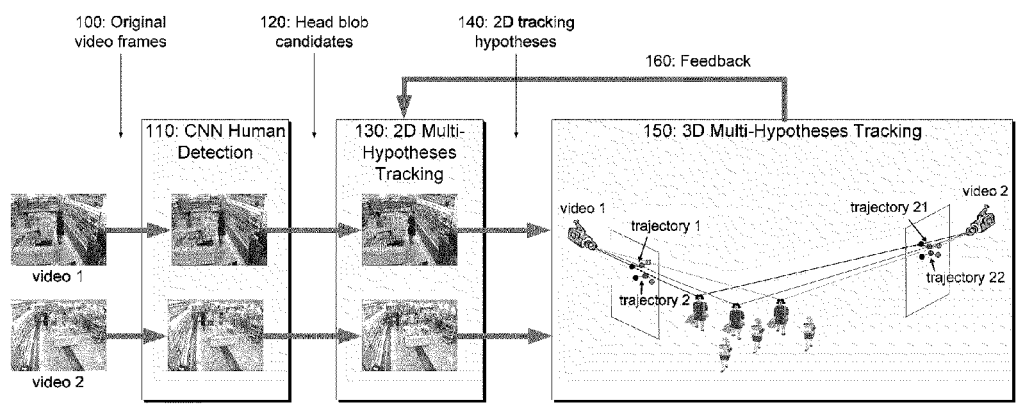
FIG. 3C shows an exemplary system for 3D human tracking.

FIG. 3C shows another exemplary system to provide 3D tracking of people. In this system original video frames 100 are provided to a human detector 110. In one implementation, the system applies a Convolutional Neural Network (CNN) to detecting human heads in each image. Compared with other popular object detectors such as AdaBoost, CNNs have the ability to perform feature extraction and classification within the network structure through learning. Another advantage of CNNs is that unlike a binary classifier such as AdaBoost, CNNs can perform multi-class classification. In the system, for example, the CNN also computes a person's head orientation, which is a label from one of the following eight classes: frontal, frontal left, frontal right, back, back left, back right, left, right. Such information is useful for the tracking performance.

Figure 2:
FIG. 2 shows a crowded scene where people's heads are visible even if their feet are not visible.
Figure 4A:
FIGS. 4A and 4B show an example of human detection result.
Figure 4B:

The CNN searches over the whole image at a few scales and outputs the following information at each pixel.
the probability indicative of a blob around the pixel does in fact represent a human head
the size of the blob
the head orientation as described earlier FIGS. 4A and 4B show an example of human detection result. FIG. 4A shows an example of the detection probability map corresponding to the image shown in FIG. 2. In FIG. 4(a), the detection probability map of FIG. 3 given by the CNN-based human head detector. In FIG. 4B The discrete result after applying non-maxima suppression to FIG. 4(a). Each blob shows id and probability of the corresponding head candidate.

For the purpose of visualization, the map is color-coded and overlaid onto the original image. Color temperature increases in the order from blue to red. A hottercolor indicates a higher score. As can be seen from FIG. 4(a), although the probability at different head locations varies, the CNN does detect most of the visible human heads.

To obtain discrete results, the system apply a non-maxima suppression step to the continuous detection maps to retrieve only information of the pixels with the locally maximum detection probability that is above some threshold. The result of applying non-maxima suppression step to FIG. 4A is shown in FIG. 4(b).

For each view, the human detection module generates human head candidates 120 (FIG. 3) at each frame. If the system use a single-layered 3D tracker that takes directly the candidates from each view at each frame, the tracker may be deluged with a large amount of the incoming data over time. This is the reason that the system uses 2D trackers 130 as the middleware in the hierarchical architecture shown in FIG. 2. The idea is simple: divide and conquer. Each view has a 2D tracker 130 that manages 2D tracking trajectories 140 on its own and outputs only promising 2D tracking hypotheses to the only 3D tracker 150 at the top level. This significantly reduces the amount of data passing to the 3D tracker 150 and keep the overall complexity at a manageable level.

The task of 2D tracking by the 2D tracker 130 is formulated as a data association problem, i.e. matching between the detection responses and the tracking hypotheses. Suppose at the current frame t, the system has n human head candidates and m existing tracking hypotheses. Each hypothesis is represented as a tracking trajectory. For each pair of detection and hypothesis, denoted by $d_i$ and $h_j$ respectively, there are two choices: connect or do not connect $d_i$ with $h_j$. The choice can be based on difference between $d_i$ and $h_j$, which consists of the following factors:

Appearance: The system use color histogram H to represent the object appearance, which is calculated based on pixels within the head blob and is quantized into 64 bins (i.e. 4 bins for each of the R, G, B channel). The value of each bin is divided by the total number of pixels and thus represents the color distribution, i.e.

$$H_i = \frac{C_i}{\sum_k C_k} \quad (1)$$

where $C_i$ denotes the number of pixels in the i-th bin.

Symmetric Kullback-Leibler (KL) divergence is then used to measure the difference between systemen two histograms H and H', i.e.

$$KL(H, H') = \sum_i H_i \log\left(\frac{H_i}{H'_i}\right) + \sum_i H'_i \log\left(\frac{H'_i}{H_i}\right) \quad (2)$$

where i is the bin index.

Each hypothesis (trajectory) maintains two color histograms: $\dot{H}$ is the histogram of the last blob added to the trajectory and $\overline{H}$ is the average histogram of all blobs on the trajectory. The appearance difference between detection $d_i$ and a hypothesis $h_j$ is defined as $$D_A(d_i, h_j) = \min(KL(H_{d_i}, \dot{H}_{h_j}), KL(H_{d_i}, \overline{H}_{h_j})) \quad (3)$$

where $H_{d_i}$ is the color histogram of di.

These histograms represent both the short term and the long term memory of the object appearance. $\overline{H}$ is especially useful when the object has been occluded temporarily. Because its appearance is recorded in $\overline{H}$, the object can be tracked after it reappears.

Location: Euclidean distance is used to measure the spatial distance between $d_i$ and the last blob of $h_j$, i.e.

$$D_L(d_i, h_j) = |L_{d_i} L_{h_j}| \quad (4)$$

where L denotes the image location of a blob.

Size: The blob size is taken into account because sudden change of the blob size usually indicates a wrong match and should be penalized. The size difference between $d_i$ and the last blob of $h_j$ is defined as $$D_s(d_i, h_j) = ((sx_{d_i} - sx_{h_j})^2 + (sx_{d_i} - sx_{h_j})^2)^{\frac{1}{2}} \quad (5)$$

where sx and sy denotes the width and height of a blob, respectively.

Orientation: Sudden change of the head orientation should also be penalized. The orientation difference between $d_i$ and the last blob of $h_j$ is defined as $$D_o(d_i, h_j) = |O_{d_i} - O_{h_j}|/\pi \quad (6)$$

where O denotes the orientation of a blob.

The overall difference score between $d_i$ and $h_j$ is a weighted sum of the above functions, i.e.

$$D(d_i,h_j)=w_A D_A(d_i,h_j)+w_L D_L(d_i,h_j)+w_S D_S(d_i,h_j)+w_o D_o(d_i,h_j) \quad (7)$$

Figure 5:
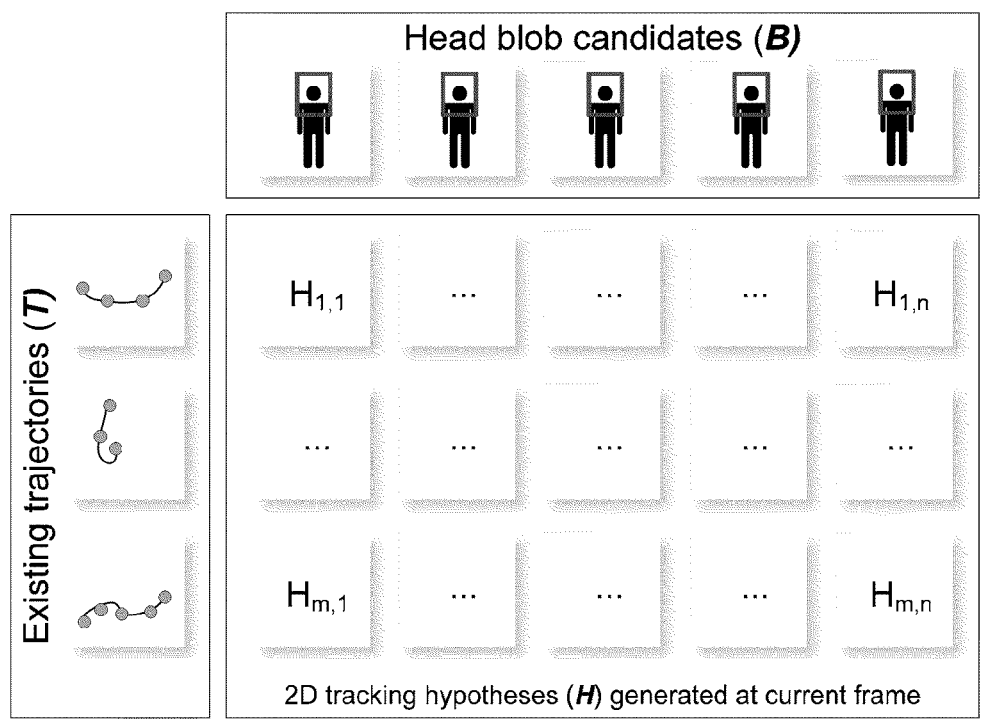
FIG. 5 shows an exemplary matrix of difference scores between detection and existing trajectories.
Figure 6:
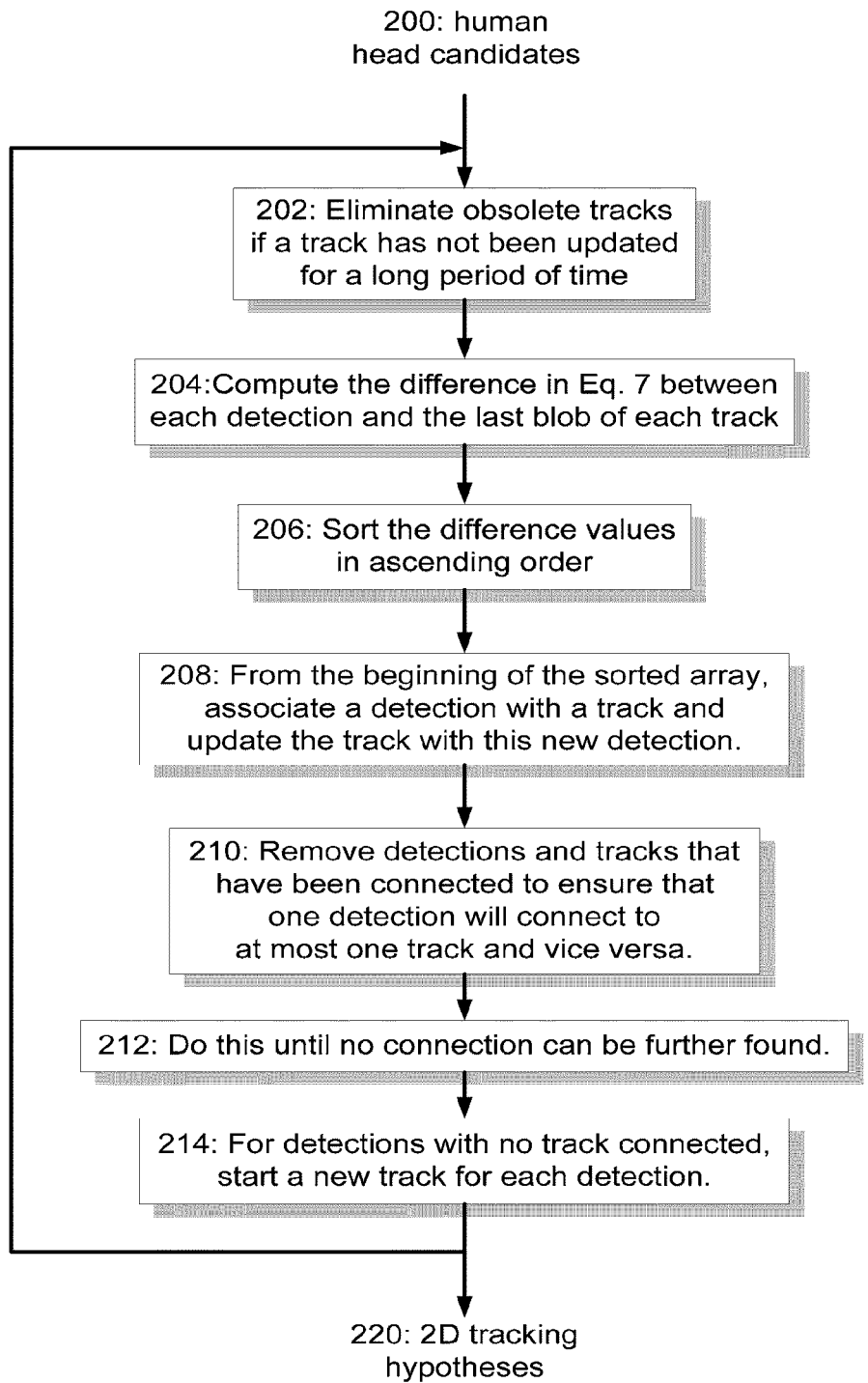
FIG. 6 shows an exemplary 2D tracking process.

The system computes the difference score as in Eq. 7 for each pair of detection and hypothesis and the system get an m by n matrix of difference scores, as shown in FIG. 5. FIG. 5 shows an exemplary matrix of difference scores between detection and existing trajectories. In FIG. 5, each column, denoted by B, corresponds to one detected human head blob given by the CNN-based human head detector at the current frame. Each row, denoted by T, corresponds to one existing 2D tracking trajectory up to the previous frame. For each pair of B and T, we compute their difference score as in Eq. 7. Therefore, for n detections and m existing trajectories, we have an m by n matrix of difference scores. The tracking process finds a set of matches that give the least overall difference score. The process is illustrated by the flowchart in FIG. 6. FIG. 6 shows an exemplary 2D tracking process. Human head candidates are provided to the process (200). Next, the process eliminates obsolete tracks if a track has not been updated for a predetermined period (202). The process computes the difference score of Eq. 7 between each detection and the last blob of each track (204). The difference values are then sorted in ascending order (206). From the beginning of the sorted array, the process associates a detection with a track and updates the track with the new detection (208). The process then removes detections and tracks that have been connected to ensure that one detection will connect to at most one track and vice versa (210). This is done until no connection remains (212). For detections with no connected track, the process starts a new track for each detection (214). The result are 2D tracking hypotheses (220).

Figure 1:
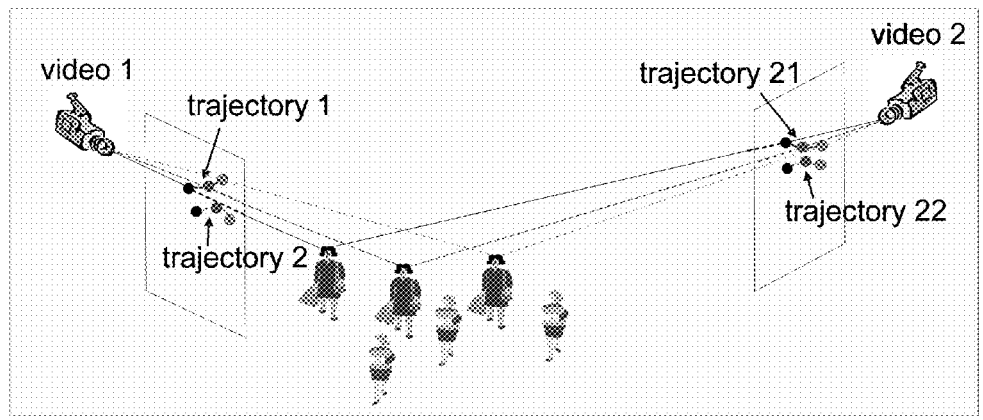
FIG. 1 shows one exemplary camera set up or environment for 3D human tracking.
Figure 7:
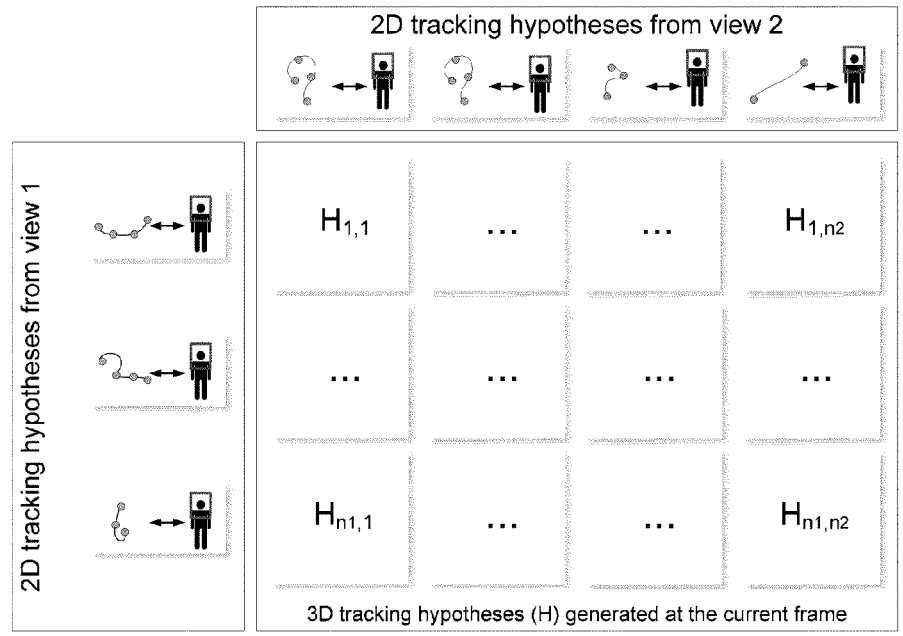
FIG. 7 shows an exemplary matrix of difference scores between 2D hypotheses from two different views.

FIG. 7 shows an exemplary matrix of difference scores between 2D hypotheses from two different views. In FIG. 7, each row corresponds to one 2D tracking trajectory given by the 2D tracker from the first view. Each column corresponds to one 2D tracking trajectory given by the 2D tracker from the second view. For each pair of trajectories from each of the two views, if we correspond these two 2D trajectories in 3D, as illustrated in FIG. 1, a 3D trajectory can be obtained, where each point P is computed from the intersection of two rays that connect the camera optical center and the head blob in each view. In reality, these two rays may never intersect due to image noise and/or calibration/detection error. 3D geometry indicates that the shortest distance between these two rays is in the direction of their common perpendicular, as shown in the magnified image in FIG. 8. In the system, the center of the line segment on the common perpendicular approximates P and the shortest distance $\epsilon$ is used to measure the error of the approximation. Therefore, if n1 trajectories are observed from the first view and n2 trajectories from the second view, an n1 by n2 matrix of difference scores can be built.

The 2D tracking algorithm can be extended to 3D. For a two-view system, if the system gets m and n tracking hypotheses from the first view and the second view, respectively, the system can process a similar matrix of difference scores, as illustrated in FIG. 7. Each score consists of the difference score inherited from each view, as well as the 3D distance between rays that connect the camera optical center and the person's head location in each view. When a correspondence has been established by the 3D tracker, each of the corresponding 2D trajectory can add the detected human blob as its latest blob.

Figure 8:
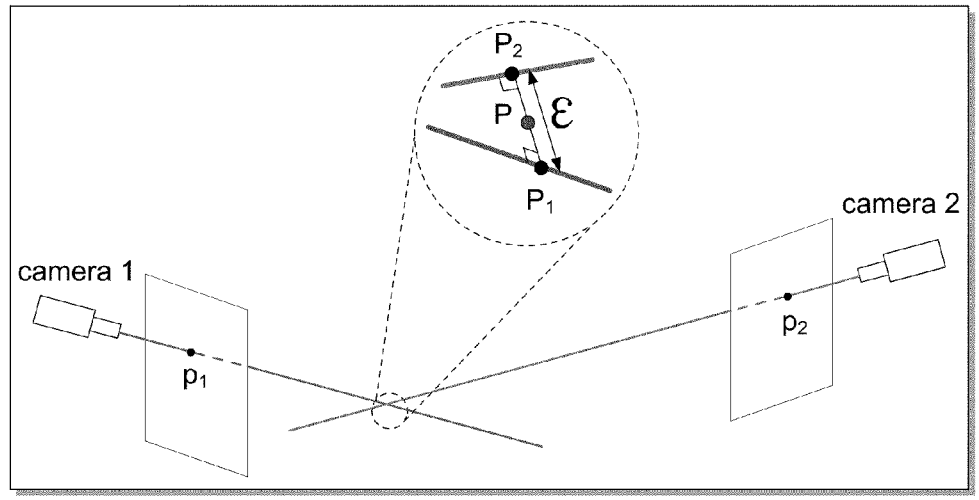
FIG. 8 shows an exemplary set up to determine an intersection point from two views.

FIG. 8 shows an exemplary set up to determine an intersection point from two views. When two rays do not actually intersect, P, the center of the line segment P1-P2 on the common perpendicular approximates the intersection point.

In summary, instead of extracting foreground blobs, the system explicitly detects humans using Convolutional Neural Networks. The Multi Hypothesis Tracking has been enhanced for 3D tracking by utilizing videos from multiple views to give accurate and consistent 3D tracking result. The process is efficient in that it only selects truly promising hypotheses so that the searching space is kept small enough to make complexity manageable.

The system has been tested on videos taken from a grocery store in Japan. The average length of the videos is about 15 minutes and the average number of persons in the scene at each frame is about 9. The system achieves 82% recall rate and 84% precision. The system also tested a traditional single-layered MHT tracker using the same experiment setup. The system is faster by an order of magnitude and achieves a near real time speed at about 19 frames per second.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A method to perform multi-human three dimensional (3D) tracking, comprising:
   for each single view, providing two dimensional (2D) human detection candidates from a camera to a 2D tracking module wherein a Convolutional Neural Network (CNN) generates the 2D human detection candidates;
   a. independently performing 2D tracking in each 2D tracking module and reporting promising 2D tracking hypotheses to a 3D tracking module;
   b. selecting trajectories from the 2D tracking modules to generate 3D tracking hypotheses; and
   c. determining a difference score between the detection and the trajectory as a weighted sum of appearance, location, blob size, and orientation.

2. The method of claim 1, comprising providing feedback to the 2D tracking modules to update a 2D tracking module status.

3. The method of claim 1, wherein the 2D tracking comprises matching between new detections and existing tracking hypotheses.

4. The method of claim 1, wherein each hypothesis comprises a tracking trajectory.

5. The method of claim 1, comprising determining a difference between the detection and the trajectory for each pair of detection and hypothesis.

6. The method of claim 1, comprising matching between new detections and existing tracking hypotheses based on one or more of: appearance, location, blob size, and orientation.

7. The method of claim 1, comprising determining a difference score for each pair of detection and hypothesis.

8. The method of claim 1, wherein each 3D tracking hypothesis comprises a correspondence between a pair of 2D hypotheses from each of the two views and each correspondence results in a 3D trajectory.

9. The method of claim 1, comprising generating a pairwise correspondence matrix among 2D hypotheses from each of the two views.

10. The method of claim 1, comprising sorting 3D hypotheses according to a 3D intersection error.

11. The method of claim 1, comprising pruning a 3D hypothesis based on a hypothesis conflict or expiration.

12. The method of claim 1, wherein the 2D trajectories are synchronously updated.

13. The method of claim 1, comprising updating a 2D trajectory if a corresponding 3D trajectory is added, pruned, or combined with another 3D trajectory.

14. An apparatus to perform multi-human 3D tracking with a plurality of cameras, comprising:
   a. at each view, a module coupled to each camera to provide 2D human detection candidates;
   b. a plurality of 2D tracking modules each coupled to the CNN and each 2D tracking module managing 2D tracking independently;
   3D tracking module coupled to the 2D tracking modules to receive promising 2D tracking hypotheses, the 3D tracking module selecting trajectories from the 2D tracking modules to generate 3D tracking hypotheses wherein a Convolutional Neural Network (CNN) generates the 2D human detection candidates and the module determining a difference score between the detection and the trajectory as a weighted sum of appearance, location, blob size, and orientation.

15. The apparatus of claim 14, wherein the 3D tracking module provides feedback to the 2D tracking modules to update a current status of each 2D tracking module.

16. The apparatus of claim 14, wherein each 3D tracking hypothesis comprises a correspondence between a pair of 2D hypotheses from each of the two views and each correspondence results in a 3D trajectory.

17. The apparatus of claim 14, wherein the 2D trajectories are synchronously updated.

* * * * *